United States Patent [19]

Kato

[11] 3,885,971

[45] May 27, 1975

[54] CONTACT SCREEN AND METHOD FOR NONLINEAR TRANSFORMATIONS AND FILTERING IN COHERENT OPTICAL SYSTEMS

[75] Inventor: Hisatoyo Kato, Minami-Ashigara, Japan

[73] Assignee: Fuji Photo Film Co., Ltd., Tokyo, Japan

[22] Filed: Aug. 1, 1973

[21] Appl. No.: 384,538

[52] U.S. Cl.................................. 96/116; 96/118
[51] Int. Cl............................................. G03f 5/00
[58] Field of Search ................. 96/116, 118, 44, 45; 355/79, 125

[56] References Cited
UNITED STATES PATENTS

| | | | |
|---|---|---|---|
| 3,275,445 | 9/1966 | Middlemiss | 96/116 |
| 3,461,229 | 8/1969 | Oppenheimer | 96/116 |
| 3,565,527 | 2/1971 | Crespi | 96/116 |
| 3,666,479 | 5/1972 | Wiese | 96/116 |
| 3,737,321 | 6/1973 | Torr et al. | 96/116 |

Primary Examiner—Norman G. Torchin
Assistant Examiner—Edward C. Kimlin
Attorney, Agent, or Firm—Sughrue, Rothwell, Mion, Zinn & Macpeak

[57] ABSTRACT

Halftone contant screens, their manufacture and their use for performing nonlinear transformations and filtering over a large dynamic range in coherent optical image processing systems are described. The screens are effective for the removal or filtering of multiplicative signals and noise and may be made to provide logarithmic, exponential and square-law transformations as well as other nonlinear but not necessarily mathematically defined transformations depending on the specific application. Some of the possible specific applications include the removal of speckle noise in laser light imaging, extraction of images from multiplicative noise such as images of non-uniformly illuminated transparencies, and biomedical image processing.

14 Claims, 3 Drawing Figures b    c a    b    c

CONTACT SCREEN AND METHOD FOR NONLINEAR TRANSFORMATIONS AND FILTERING IN COHERENT OPTICAL SYSTEMS

BACKGROUND OF THE INVENTION

1. Field of the Invention

This invention relates to coherent optical image processing systems and, more particulary, a the method which provides non-linearly transformed input patterns in coherent optical processing systems.

2. Description of the Prior Art

Coherent optical image processing systems have been limited in the past to linear filtering operation, such as matched filtering and inverse filtering (deconvolution). In many applications this limitation is serious. For example, multiplicative signals and noise such as speckle noise in laser light imaging and images of non-uniformly illuminated transparencies cannot be processed through coherent optics. Multiple threshold clipping of images which is important for sampling of images is another example of nonlinear transformations which have not been realized for coherent optical processing.

Photographic film provides one possible means for introducing nonlinear transformations. Unfortunately, however, if large dynamic range of exposure is required (e.g. 100:1), as is often the case, the only nonlinear transformations that can be realized accurately are those that arise from operation in the linear region of the Hurter and Driffield curve. More specifically, the amplitude transmittance $t_A$ is related to exposure E by $$t_A = k \, E^{-\gamma/2}, \tag{1}$$

where $\gamma$ is the slope of the Hurter and Driffield curve, and can be positive or negative. See for example, J. W. Goodman, *Introduction to Fourier Optics*, McGraw-Hill Book Co. (1968), Section 7–2. Regrettably, this power law transformation is not flexible enough to include many of the nonlinear transformations that might be of interest. Among important nonlinear transformations not included in the class attainable by photographic film are logarithmic transformations, exponential transformations and multiple threshold clipping.

A. V. Oppenheim and his co-workers have formulated and studied in detail the notion of generalized linear filtering in homomorphic systems, and by means of digital processing demonstrated their application to the filtering at multiplicative signals using logarithmic transformation. See, for example, A. V. Oppenheim, *Information and Control*, 11 (1967), page 528, and A. V. Oppenheim, R. W. Schafer and T. G. Stickham, Jr., *Proceedings of the IEEE*, 56 (1968), page 1264.

On the other hand, although computer image processing can handle nonlinear operations, the cost of both computation and computer apparatus including image input and output devices are extremely high, compared with coherent optical processing. It is another disadvantage of digital image processing by computer that all the pictures to be processed must be divided into tiny segments of cells below the resolution of human eyes in order to get fine processing, and that it consequently takes an extremely long time of computation which sometimes makes realtime processing impossible.

Therefore, simple and easy methods which provide nonlinear operations associated with coherent optical image processing have been long awaited.

SUMMARY OF THE INVENTION

Accordingly it is an object of the present invention to provide simple and easy methods of fabricating nonlinearly transformed input patterns which can be directly used in linear coherent optical processing systems.

The foregoing and other objects of the invention are attained by providing halftone contact screens having dots with the proper light transmittance profile. Where the nonlinear transformation can be expressed contact screen is derived as a function of the fractional area of a dot through the equation of the nonlinear transformation. According to the teachings of the invention, contact screens may be made by using a step and repeat camera, a pinhole array camera, multiple imaging by coherent optical filtering, multiple exposure of different sized solid dots to make a step approximation of the required dot profile, or control of main, flash and highlight exposures as used in convention halftone processing techniques.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENTS

Figure 1:
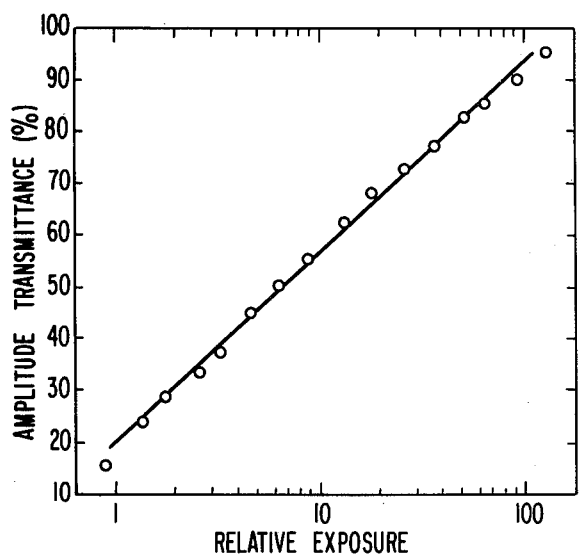
FIG. 1 is a measured characteristic of the logarithmic contact screen, which is one of the embodiments of the invention.

As it is well known, halftone contact screens are used to convert continuous tone pictures into halftone pictures. This process is a kind of two-dimensional pulse-width modulation which can be demodulated easily by lowpass filtering. By designing a proper light transmittance profile for the dots in a halftone contact screen, any of a multitude of nonlinear operations can be performed by the halftone screen process.

Suppose that we wish to control the amplitude transmittance such that it is proportional to a specific nonlinear function F of exposure within the exposure range $E_1 \leq E \leq E_2$. It is convenient to deal with normalized exposure $\hat{E} = E/E_1$, in which case the range of interest is $1 \leq \hat{E} \leq Em$, where $Em = E_2/E_2$. Thus, the nonlinear function to be realized is expressed as follows:

$$t_A = F(\hat{E}), \text{ where } 1 \leq \hat{E} \leq Em. \tag{2}$$

Since the amplitude transmittance $t_A$ mentioned above will be realized in halftone transparencies, using a specially designed nonlinear contact screen, the relationship between the amplitude transmittance $t_A$ and the fractional area (percent area) of the halftone dot A in a halftone transparency is $$t_A{}^2 = Tw - A(Tw - T_B) \quad (3)$$

where Tw is the intensity transmittance of the transparent area of a halftone transparency and $T_B$ is the intensity transmittance of the opaque area (dot's area) of a halftone transparency. Now, a specific nonlinear transformation described in equation (2) is realized by transmitting the light of exposure $\hat{E}$ through the corresponding nonlinear contact screen whose optical density at the edge of the fractional area A is expressed as Ds (A), and by recording the transmitted light on a hard-clip film with a perfect threshold effect. This relationship is expressed as follows:

$$Ds(A) = \log \hat{E}. \quad (4)$$

To sum up, a proper light transmittance profile Ds (A) for the dots in a nonlinear halftone contact screen is determined by deriving a dot profile Ds (A) as a function of the fractional area A of a dot through these three equations, that is (2), (3) and (4).

Examples of the dot profiles for specific nonlinear transformations are explained below. The first such example is a logarithmic transformation, which is of particular importance because, with such a transformation, multiplicative signals and noise are transformed to additve form and can then be processed by linear coherent optical filterng. The logarithmic function which corresponds to equation (2) is shown below, taking into account a normalization coming from the range limitation of the amplitude transmittance; that is, $0 \leq t_A \leq 1$:

$$t_A = \log \hat{E}/\log Em. \quad (5)$$

Suppose that the recording film of halftone transparency is ideal (Tw=1 and $T_B$=O), the dot profile of logarithmic contact screen is derived through equations (3), (4) and (5) as follows:

$$Ds(A) = \sqrt{1-A} \log Em. \quad (6)$$

Since the logarithmic function expressed in equation (5) is monotonicly increasing function of the exposure, this transformation is readily performed through halftone positive processing.

The second example is a linear mapping of intensity into amplitude, which is also called a square-law mapping and is essential when pictures are to be processed by coherent optical systems whose processing is linear on the amplitude basis. In this case, the nonlinear function described in equation (2) is $$t_A = \hat{E}/Em \quad (7)$$

and the resultant dot profile of this screen is found to be $$Ds(A) = \log(\sqrt{1-A} Em), \quad (8)$$

using the same procedure as in the first example. The linear mapping of intensity into amplitude is usually performed by making use of the nonlinearity associated with photographic film which is described by equation 1; that is, by making a positive copy with an overall gamma of −2. Unfortunately, however, this photographic process requires very careful treatment and highly trained skilled operators since the linear region of the Hurter and Driffield curve must be precisely controlled to get an overall gamma of −2. In contrast to this, if we use the contact screen of this invention described in equation (8), we can get the linear mapping of intensity into amplitude easily using the well established techniques of halftone processing. There are no difficulties in processing such as careful and precise control of photographic characteristics.

The third example is an exponential transformation, which is necessary to inverse-transform logarithmically transformed patterns back into the original world. Taking a specific exponential function $$t_A = 0.9^{\hat{E}-1} \quad (9)$$

as an example, we can get the corresponding contact screen whose dot profile is expressed as $$Ds(A) = \log(\log \sqrt{1-A}/\log 0.9 + 1). \quad (10)$$

Since, in this specific example, the exponential function is a monotonicly decreasing function of the exposure, this transformation is also readily performed through halftone negative processing.

It will be understood by those skilled in the art that the mathematical derivation in each of the foregoing three examples are for the idealized situation where $T_w = 1$ and $T_B = O$. It will also be apparent that in each of the equations (5), (7) and (9) that an attenuating factor as a constant of proportionality may be used in a practical case.

Exponential transformations, together with logarithmic transformations, enable us to process multiplicative signals and noise through linear coherent optical systems. There are many applications in which it is desirable to use this kind of processing of image data. Image formation is predominantly a multiplicative process, in both natural and photographic images. For example, the illumination and reflectance of objects are combined multiplicatively to form observable brightness. Both speckle noise in coherent imaging and grain noise in photographic processes are good examples of multiplicative noise processes. Biomedical image processing offers another potential field of applications. For examle, X-ray imagery involves fundamentally the multiplicative interaction of various absorbing structures. In addition, γ-ray images obtained in nuclear medicine suffer from considerable multiplicative noise.

There are many other nonlinearities which cannot be expressed mathematically, but are important in practical applications. Multiple threshold clipping is among this class. The nonlinearities which are inevitably introduced through image recording processes such as the shoulder and toe effects of photographic characteristics, can be removed by inverse-transforming them with the compensating contact screen of this invention which is designed to cancel the nonlinearities.

It also should be mentioned that the nonlinear operations attainable with the contact screen method of this invention is limited to one which can be described as monotonic functions in a weak sense.

There are several experimental techniques for realizing the nonlinear contact screens mentioned above. Use of a step and repeat camera is the most straight forward approach. After fabricating a single magnified dot whose density profile is realized according to the theoretical calculation described above as a basic dot pattern, it is photograhically reduced and periodically repeated by a step and repeat camera. Two steps of reduction and repetition are desirable to get a nonlinear contact screen with large format and fine structure. Very careful control and compensation of the characteristics of the films used in the fabrication of the screen are necessary to get high quality of the contact screen.

A pinhole array camera and multiple imaging by coherent optical filering can provide simpler and alternative means to expand a single basic dot into a periodic dot structure if a screen to be realized is rather small.

Another technique is multiple exposure of different sized solid dots to make a step approximation to the required dot profile. In this technique, a bunch of different sized solid dot patterns with the same frequency are prepared. These patterns are easily fabricated by making halftone transparencies of different exposure levels of uniform illumination. The next step of this technique is to multiple-expose a continuous tone film with these patterns, changing exposure levels so that the total exposure profile may approximate stepwise the desirable density profile of the continuous tone film which finally becomes a designed nonlinear contact screen according to the theoretical calculation. Even though the dot profile is stepwise approximated in this technique, the resultant screen has a fairly smooth profile due to the smear effect of the contact printing during the multiple exposure. The difficulty associated with this technique is the precise registration of different sized solid dots patterns. To avoid this difficulty, a magnified version of patterns may be used and then, photographically reduced down to a proper size of a screen.

As a summary, the following are advantages and improvements of this invention over known methods:

1. While photographic film allows only a limited class of nonlinear transformations to be applied to pictures, a much wider class can be easily realized by use of specifically designed halftone contact screens of this invention. The nonlinearly transformed patterns by the method of this invention are used directly as input patterns for coherent optical processing. Thus, this invention will clearly increase the flexibility and usefulness of coherent optical image processors.

2. Since coherent optical systems work linearly on an amplitude basis, all imput patterns which are described on an intensity basis must be linearly converted into amplitude. This process is usually done by making a positive copy with an overall gamma of −2. In the method of this invention, intensity is automatically and directly mapped into amplitude, and therefore, this method does not introduce extra processing and complexity above and beyond known methods. The only difference is the use of a contact screen during the copying process.

3. One can make use of the well established techniques of halftone screen processing to get a nonlinearly transformed halftone picture by the method of this invention. There are no difficulties in processing such as careful control of photographic characteristics which is often encountered when photographic film is used as a means for introducing non-linearities.

As a specific example of an embodiment made according to the invention, a contact screen which performs a logarithmic transformation was realized. This logarithmic contact screen maps a continuous tone picture into a halftone picture whose amplitude transmittance is proportional to the logarithm of intensity transmittance of the continuous tone picture, and has a light transmittance profile of a dot described in equation (6).

A multiple exposure technique of different sized solid dots to make a step approximation to the required dot profile was used to fabricate the logarithmic contact screen. A magnified logarithmic contact screen of 10 inches by 10 inches format with 15 lines per inch dot frequency was realized using multiple exposure of 10 different sized solid dot patterns of the same format with the same dot frequency, which were prepared by recording the enlarged light distribution of a conventional contact screen on a lithographic film. Precise registration of the patterns was performed with register pin systems. The proper exposure of each dot pattern was determined to realize the step approximation of the theoretical dot profile for logarithmic transformation described in equation 6, taking into account the nonlinearities of the films used for fabricating a logarithmic contact screen. Then this screen was four times photographically reduced for the actual applications.

A simpler and easier way to make a logarithmic contact screen was found accidentally using a commercially avalable contact screen. By making a contact negative duplicate of a Kodak Gray Contact Screen (100 lines per inch, elliptical dot) on a Kodak Contrast Process Ortho film, a logarithmic contact screen with a dynamic range of 100:1 in exposure (2.0 log units) was obtained. The measured characteristics of the screen thus obtained are shown in FIG. 1. It should be noticed that the experimental results (open circle dots) are very close to the solid line which indicates an ideal logarithmic screen.

To show the performance of the logarithmic contact screen, the following experiments were conducted. The first experiment illustrates the effect of the logarithmic transformation realized by this invention on the Fourier spectrum of an object. FIG. 2a shows the original pattern, which is composed of two multiplied gratings perpendicular to each other. The dynamic range of this pattern is from 0 to 2 in density. A halftone positive print of this pattern was made using the logarithmic screen. In addition, for comparison purposes, a positive transparency with amplitude transmittance linearly proportional to exposure was produced by making a positive copy with an overall gamma of −2.

FIG. 2b shows the optically obtained Fourier spectrum of the linearly copied crossed gratings, The spectrum of the two multiplied gratings is the convolution of the spectra of the individual gratings, and the resultant intermodulation components of the spectrum are clearly visible. FIG. 2c shows the spectrum of the logarithmically transformed crossed gratings obtained using the logarithmic contact screen. The spectra of the two gratings are now additive, as evidenced by the vanishing of the intermmodulation components.

Figure 3:
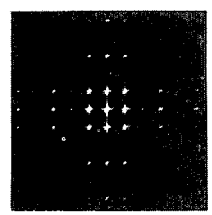
FIG. 3 is another experimental result which shows the effect of simple logarithmic filtering of a multiplicatively formed image, using the logarithmic transformation of this invention.
Figure 3:
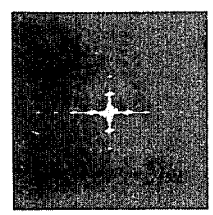
Figure 3:

A simple logarithmic filtering experiment is illustrated in FIG. 3. FIG. 3a shows the original pattern, which is the product of a continuous tone picture (a girl's face) and a Ronchi type grating. This pattern is obtained by copying two superimposed transparencies. Each transparency has a dynamic range of 1 in density, and thus, the overall dynamic range of the final pattern is 2.

A simple coherent optical filtering geometry was used to filter out the spectrum of the grating by placing absorbing spots in the frequency plane at the locations of the grating harmmonies. FIGS. 3b and 3c show the results of logarithmic filtering and linear filtering, respectively. In both cases, the same absorbing filter was used in the frequency plane. The grating is successfully removed in the logarithmic filtering process. However, the linear filtering process cannot completely remove the effects of the grating, since the two spectra are convolved rather than added.

An additional practical benefit of the logarithmic transformation over a linear transformation is a compression of dynamic range. When a density pattern with two log units of dynamic range is mapped linearly into amplitude transmittance, the dynamic range of the resultant density pattern is four log units, which is difficult to realize using photographic film. On the other hand, the dynamic range is considerably compressed by a logarithmic transformation. A density range of two in the original pattern has been experimentally mapped into a range of amplitude transmittance from 20 to 95% in the logarithmically transformed pattern, as shown in FIG. 1. This corresponds to a dynamic range of 1.35 on a density scale.

Figure 2:
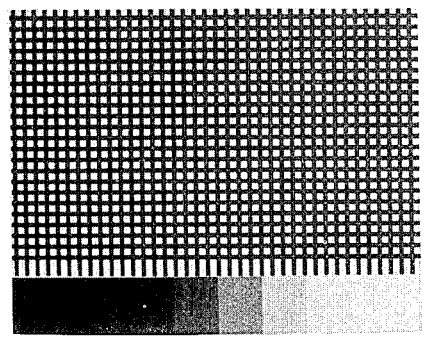
FIG. 2 is the experimental result which shows the effect of the logarithmic transformation realized by the invention on the Fourier Spectrum.

Several improvements can be envisioned which would yield a better logarithmic screen than used in the experiments illustrated by FIGS. 2 and 3. First finer dots can be used to improve the frequency response of the screen. Second, methods for obtaining a larger dynamic range can be envisioned. However, a practical limit will be the extremely low average light transmittance of a screen with much larger dynamic range.

It will be apparent that the embodiments described are only exemplary and that various modifications can be made in construction and arrangement within the scope of the invention as defined in the appended claims.

What is claimed is:

1. A nonlinear halftone contact screen useful for realizing nonlinear transformations in coherent optical processing systems, said screen being operative in said system to control the amplitude transmittance $t_A$ such that it is proportional to the specific nonlinear function F of exposure E within the exposure range $E_1 \leq E \leq E_2$, said nonlinear function being expressed as:

$$t_A = F(\hat{E}), \text{ where } \hat{E} \text{ is the normalized exposure in the range } 1 \leq \hat{E} \leq E_m, \hat{E} = E/E_1 \text{ and } E_m = E_2/E_1$$

the amplitude transmittance $t_A$ and the fractional area A of a halftone dot being expressed as:

$$t_A{}^2 = T_w - A(T_w - T_B),$$

where $T_w$ is the intensity transmittance of the transprrent area of a halftone transparency and $T_B$ is the intensity transmittance of the opaque area of a halftone transparency, said screen having an array of dots each of which has a light transmittance profile $D_s(A)$ being expressed as:

$$D_s(A) = \log \hat{E}$$

which is the density of the halftone screen dot at the edge of the area A.

2. A nonlinear halftone contact screen as recited in claim 1 wherein said nonlinear function F is a logarithmic function and is expressed in the form of:

$$t_A = \log \hat{E}/\log E_m$$

and said light transmittance profile of the dots is expressed in the form of:

$$D_s(A) = \sqrt{1-A} \log E_m.$$

3. A nonlinear halftone contact screen as recited in claim 1 wherein said nonlinear function F is a square-law function expressed in the form of:

$$t_A = \hat{E}/E_m$$

and said light transmittance profile of the dots is expressed in the form of:

$$D_s(A) = \log(\sqrt{1-A} E_m).$$

4. A nonlinear halftone contact screen as recited in claim 1 wherein said nonlinear function F is an exponential function expressed in the form of $$t_A = K^{\hat{E}}$$

where K is a contant and said light transmittance profile of the dots is expressed in the form of:

$$D_s(A) = \log(\log \sqrt{1-A}/\log K).$$

5. A method of making a nonlinear halftone contact screen useful for realizing nonlinear transformations in coherent optical processing systems, comprising:
deriving the light transmittance profile of a dot in the nonlinear contact screen as a function of the fractional area of a dot through equations of the nonlinear transformation,
fabricating a single dot whose density profile corresponds to the derived light transmittance profile, and
using the fabricated dot as a model, photographically reproducing the dot to produce a periodic dot structure on a screen.

6. A method of making a nonlinear halftone contact screen as recited in claim 5 wherein the single dot produced in said fabricating step is magnified in size when compared with the size of a dot in said periodic dot structure, said method further comprising the step of photographically reducing the size of the fabricated dot prior to the step of photographically reproducing the dot.

7. A method of making a nonlinear halftone contact screen as recited in claim 6 wherein said steps of photographically reducing and reproducing are performed with a step and repeat camera.

8. A method of making a nonlinear halftone contact screen as recited in claim 5 wherein said step of photographically reproducing is performed with a pinhole array camera and further includes the step of multiple imaging by coherent optical filtering.

9. A method of making a nonlinear halftone contact screen as recited in claim 5 wherein said fabricating step involves a step approximation to the required dot profile.

10. A method of making a nonlinear halftone contact screen as recited in claim 9 wherein said step approximation includes the steps of making a plurality of different sized dots having different uniform densities and superimposing the dots to form a stepwise approximation of a dot having the desired nonlinear density profile.

11. A method of making a nonlinear halftone contact screen as recited in claim 5 wherein said deriving step is based on a specific nonlinear function F which can be mathematically expressed as:

$$t_A = F(\hat{E}), \text{ where } 1 \leq \hat{E} \leq E_m,$$

$\hat{E}$ is the normalized exposure and $E_m$ is the maximum exposure defining the upper limit of the normalized exposure range, the amplitude transmittance $t_A$ and the fractional area A of a halftone dot being expressed as:

$$t_A{}^2 = T_w - A(T_w - T_B),$$

where $T_w$ is the intensity transmittance of the transparent area of a halftone transparency and $T_B$ is the intensity of the opaque area of a halftone transparency, the light transmittance profile $D_s(A)$ of each dot being expressed as:

$$D_s(A) = \log \hat{E}$$

which is the density of the dot at the edge of the area A.

12. A method of making a nonlinear halftone contact screen as recited in claim 11 wherein the nonlinear function F in said deriving step is a logarithmic function and is expressed in the form of:

$$t_A = \log \hat{E}/\log E_m \text{ and said light transmittance profile of the dot is expressed in the form of}$$

$$D_s(A) = \sqrt{1-A} \log E_m$$

13. A method of making a nonlinear halftone contact screen as recited in claim 11 wherein the nonlinear function F in said deriving step is a square-law function and is expressed in the form of:

$$t_A = \hat{E}/E_m \text{ and said light transmittance profile of the dot is expressed in the form of:}$$

$$D_s(A) = \log(\sqrt{1-A}\ E_m)$$

14. A method of making a nonlinear halftone contact screen as recited in claim 11 wherein the nonlinear function F in said deriving step is an exponential function expressed in the form of:

$$t_A = K^{\hat{E}}$$

where K is a constant and said light transmittance profile of the dot is expressed in the form of:

$$D_s(A) = \log(\log \sqrt{1-A}/\log K).$$

* * * * *